United States Patent
Huang

(10) Patent No.: US 8,955,123 B2
(45) Date of Patent: Feb. 10, 2015

(54) METHOD AND SYSTEM FOR PREVENTING MALICIOUS COMMUNICATION

(75) Inventor: Chiung-Ying Huang, Tapei Hsien (TW)

(73) Assignee: Acer Inc., Taipei Hsien (TW)

( * ) Notice: Subject to any disclaimer, the term of this patent is extended or adjusted under 35 U.S.C. 154(b) by 1638 days.

(21) Appl. No.: 12/198,933

(22) Filed: Aug. 27, 2008

(65) Prior Publication Data

US 2009/0320131 A1    Dec. 24, 2009

(30) Foreign Application Priority Data

Jun. 18, 2008  (TW) .............................. 97122628 A

(51) Int. Cl.
  *G06F 21/00* (2013.01)
  *H04L 29/06* (2006.01)
  *H04L 29/12* (2006.01)

(52) U.S. Cl.
  CPC ...... *H04L 63/1408* (2013.01); *H04L 29/12066* (2013.01); *H04L 29/12301* (2013.01); *H04L 61/1511* (2013.01); *H04L 61/2076* (2013.01)
  USPC .................... 726/23; 726/22; 726/24; 726/25

(58) Field of Classification Search
  USPC ...................................................... 726/22–26
  See application file for complete search history.

(56) References Cited

U.S. PATENT DOCUMENTS

| | | | |
|---|---|---|---|
| 6,986,160 B1 * | 1/2006 | LeGrow | 726/1 |
| 7,171,683 B2 * | 1/2007 | Pazi et al. | 726/13 |
| 2004/0199773 A1 * | 10/2004 | Radatti et al. | 713/176 |
| 2006/0075494 A1 * | 4/2006 | Bertman et al. | 726/22 |
| 2006/0143709 A1 * | 6/2006 | Brooks et al. | 726/23 |

FOREIGN PATENT DOCUMENTS

TW      550471 B2    9/2003

* cited by examiner

*Primary Examiner* — Saleh Najjar
*Assistant Examiner* — Peiliang Pan
(74) *Attorney, Agent, or Firm* — Alan D. Kamrath; Kamrath IP Lawfirm, P.A.

(57) ABSTRACT

A system for preventing malicious communication includes a safe module set with a specific Internet Protocol address and a Time to Live threshold value of the specific IP address to determine whether a malicious communication exists. If the malicious communication exists, the safe module can re-direct the malicious communication to a recording module of the system for recording the content of the malicious communication.

12 Claims, 4 Drawing Sheets

METHOD AND SYSTEM FOR PREVENTING MALICIOUS COMMUNICATION

BACKGROUND OF THE INVENTION

1. Field of the Invention

The present invention relates to a method and a system for preventing malicious communication.

2. Description of the Related Art

Most users receive a lot of e-mails due to the prevalence of the Internet, which also provides a way for those so-called hackers to embed or to attach "malicious software" (including common viruses, Trojan horses, backdoor programs, leaks) for attacking computers of victims.

Generally, users would use firewalls to protect their network infrastructure and to prevent outside hackers from linking to their computers. However, if users behind a firewall actively initiate a communication to the Internet, the firewall cannot provide proper protection. Usually there's little limitation for a user to initiate an outward communication. Otherwise, the user will find it difficult to use the Internet.

The Internet Protocol (IP) comprises four set of digits, for example 201.105.194.134, which is hard for users to remember. Therefore, domain names consisting of words or characters (http or URL), such as www.example.com, provide users with a more convenient way to remember the site address. A domain name server (DNS) is provided for translating a domain name (or universal resource locator, URL). For example, the DNS refers www.example.com to 201.105.194.134. When a user types the site address (for example: www.example.com), the DNS refers it to the corresponding IP address (for example 201.105.194.134) to complete the Internet connection.

In order to meet different requirements such as using a floating IP address, dynamic DNS (DDNS) is provided for users to link to non-static IP addresses. For example, www.example.com corresponds to 201.105.194.134. When the server using that IP address is under maintenance for a week, it is necessary to redirect linking requests to another server (for example 201.105.194.136). While users can use DUNS to change the IP address corresponding to www.example.com to 201.105.194.136 and to switch back to the original 201.105.194.134 thereafter. Here, users can set the Time To Live (TTL) value to be one week.

Hackers often exploit these linking behaviors to embed or to attach malicious software to initiate automatic connections of the victims' computers to the Internet to attack the victims' computers.

Therefore, it is advantageous to provide a way to solve the security problems.

SUMMARY OF THE INVENTION

It is an object of the present invention to prevent malicious communications from hackers.

It is another object of the present invention to provide a method and a system for preventing malicious communications and locating more "malicious software" (such as mutant computer viruses or new computer viruses) to further find out ways to crack or to anti-hack malicious software.

In order to achieve the above objects, the present invention provides a method and a system for preventing malicious communications. The method comprises the following steps:

S1: receiving at least one specific Internet Protocol (IP) address and an IP Time to Live (TTL) threshold value. For example, the specific IP address may be 127.0.0.1 (local host) or at least one intranet IP address. Therefore, a network administrator can use the present invention (for example, a specific software or program) to set the specific IP address to be 127.0.0.1 or the intranet IP address(es). However, the range of the specific IP address is not limited to these addresses mentioned above, as there can be other implementations for the specific IP address, which will be described further below.

S2: receiving a new IP address and a Time to Live (TTL) value, with the TTL value being the Time to Live value of the new IP address. When the user's computer is online (connecting to the Internet), the present invention can obtain the new IP address and the TTL value.

S3: determining whether the new IP address corresponds to the at least one specific IP address. In this step, it is determined whether the new IP address received by the user's computer corresponds to the specific IP address set by the network administrator. If it is "True", the present invention further provides a redirected IP address (step S5) to redirect the user's computer to the redirected IP address, not the new IP address.

S4: determining whether the TTL value is smaller than or equal to the TTL threshold value. In this step, it is determined whether the TTL value received by the user's computer is smaller than or equal to the TTL threshold value set by the network administrator. If it is "True", the present invention further provides a redirected IP address (step S5) to redirect the user's computer to the redirected IP address, instead of the new IP address.

Besides, the present invention provides a system for preventing malicious communications, which comprises: a safe module and a recording module. The safe module identifies a malicious communication and redirects the malicious communication to a redirected IP address according to a website query list, a new IP address or a TTL. The recording module records the malicious communication redirected to the redirected IP address, with the safe module being an embedded or a plug-in module of a domain name server (DNS).

Furthermore, the safe module comprises a query checking unit set with the website query list. When a user is trying to link to a website address, the query checking unit checks whether the website address corresponds to the website query list to identify the malicious communication.

The safe module further comprises a response checking unit. When the query checking unit finds out that the website address does not match with the website query list, the safe module receives the new IP address and the TTL, and the response checking unit checks the new IP address and the TTL in order to identify the malicious communication. The response checking unit can use the method described above to check the new IP address and the TTL to prevent malicious communications.

In order to achieve another object of the present invention to locate more malicious software and to develop cracking and anti-hacking techniques, the safe module further comprises a redirecting device, when the query checking unit or the response checking unit identifies the malicious communication, the redirecting device redirects the malicious communication to the redirected IP address. Here, a monitoring device (software/hardware based) is set with the redirected IP address to log the content of the malicious communication to develop corresponding cracking and anti-hacking techniques.

Figure 1A:
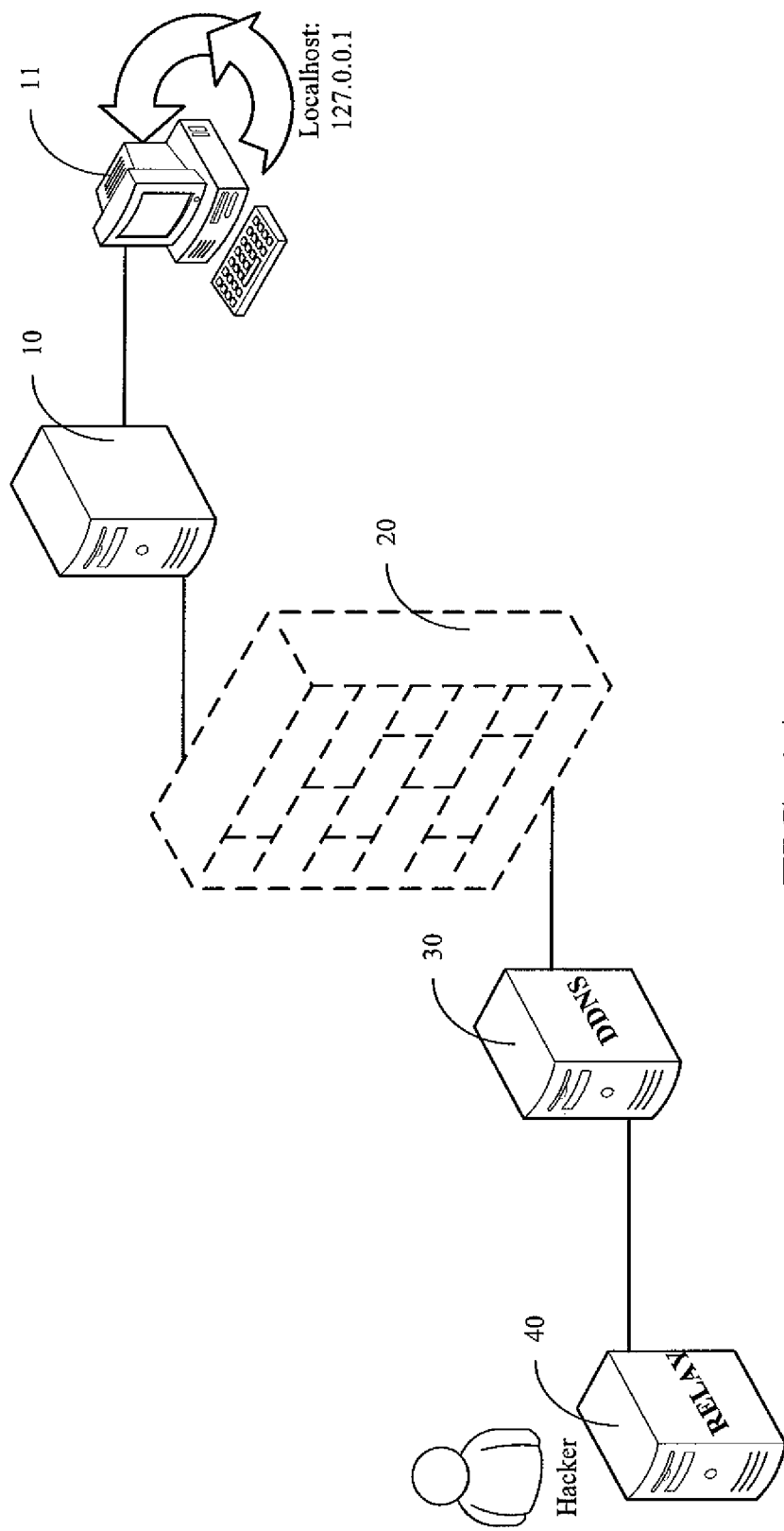
FIG. 1A and FIG. 1B illustrate how a hacker establishes a network link to attack a user's computer.

| ☐Reference Numerals☐ | |
|---|---|
| user's computer 11, 12 | server 10 |
| firewall 20 | DDNS server 30 |
| repeater 40 | safe module 31 |
| query checking unit 311 | redirecting device 312 |
| response checking unit 313 | recording module 32 |

DETAILED DESCRIPTION OF THE PREFERRED EMBODIMENTS

The advantages and innovative features of the invention will become more apparent from the following detailed description when taken in conjunction with the accompanying drawings.

Please refer to FIG. 1A, which illustrates how a hacker establishes a network link to attack a user's computer. When a user's computer 11 tries to link to the Internet, at first, it queries the domain name server (DNS) for resolving the corresponding IP address. The DNS can be implemented in an internal server 10. When the DNS of the internal server 10 fails to resolve the IP address to be linked, it is possible to search the IP address from other outside DNS (not shown in figure). A dynamic DNS (DDNS) 30 provides floating IP users with IP addresses which can be switched through a web page. For example, formerly www.badsite.com corresponds to 201.100.194.134, and it is possible to let www.badsite.com correspond to 127.0.0.1 through the DDNS. The number of DNS and/or DDNS is not limited. In short, when the user's computer 11 is online (connecting to the Internet), it can query the domain name servers one by one through the DNS hierarchy till it finds the corresponding IP address.

Figure 1B:
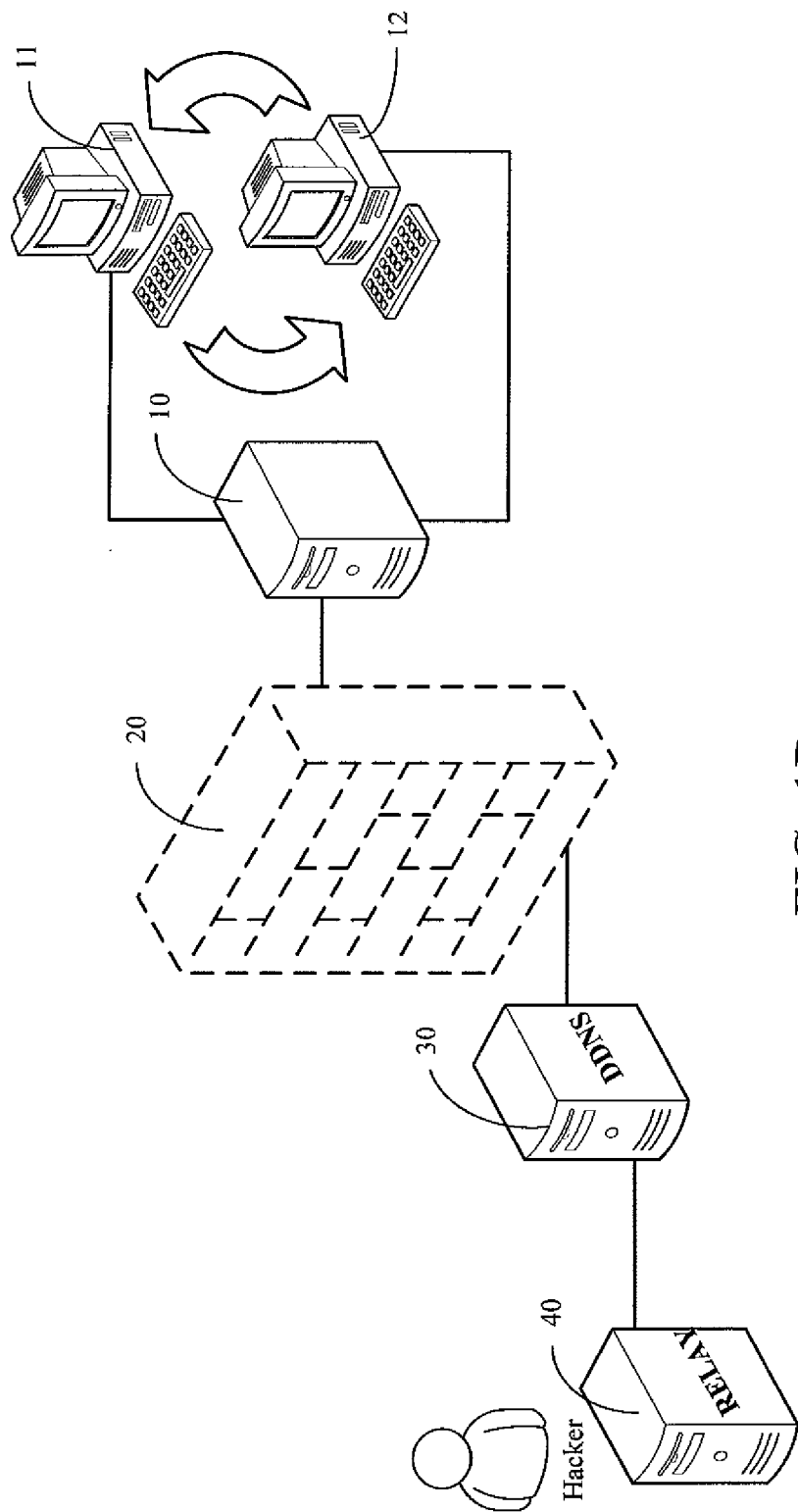

It is well known to those skilled in the art that hackers can use e-mail or other ways to let the user's computer 11 link to a repeater 40 of the website of www.badsite.com. As shown in FIG. 1A, hackers can exploit the features of the DDNS 30 to provide a local host IP (ie. localhost: 127.0.0.1) when the user's computer 11 tries to link to www.badsite.com. Then, a firewall 20 would fail to find out that www.badsite.com is in fact a malicious web site. Alternatively, as shown in FIG. 1B, hackers can exploit the features of the DDNS 30 to provide a intranet IP corresponding to www.badsite.com, so the user's computer 11 would link to other user's computer 12 of the intranet when it tries to link to www.badsite.com.

When a hacker wants to initiate an attack to the user's computer 11, the hacker can change the DDNS 30 setting to let www.badsite.com correspond to the real IP address (for example, 201.100.194.134). Thus, when the user's computer 11 links to the repeater 40, the hacker can initiate the attack.

Figure 2:
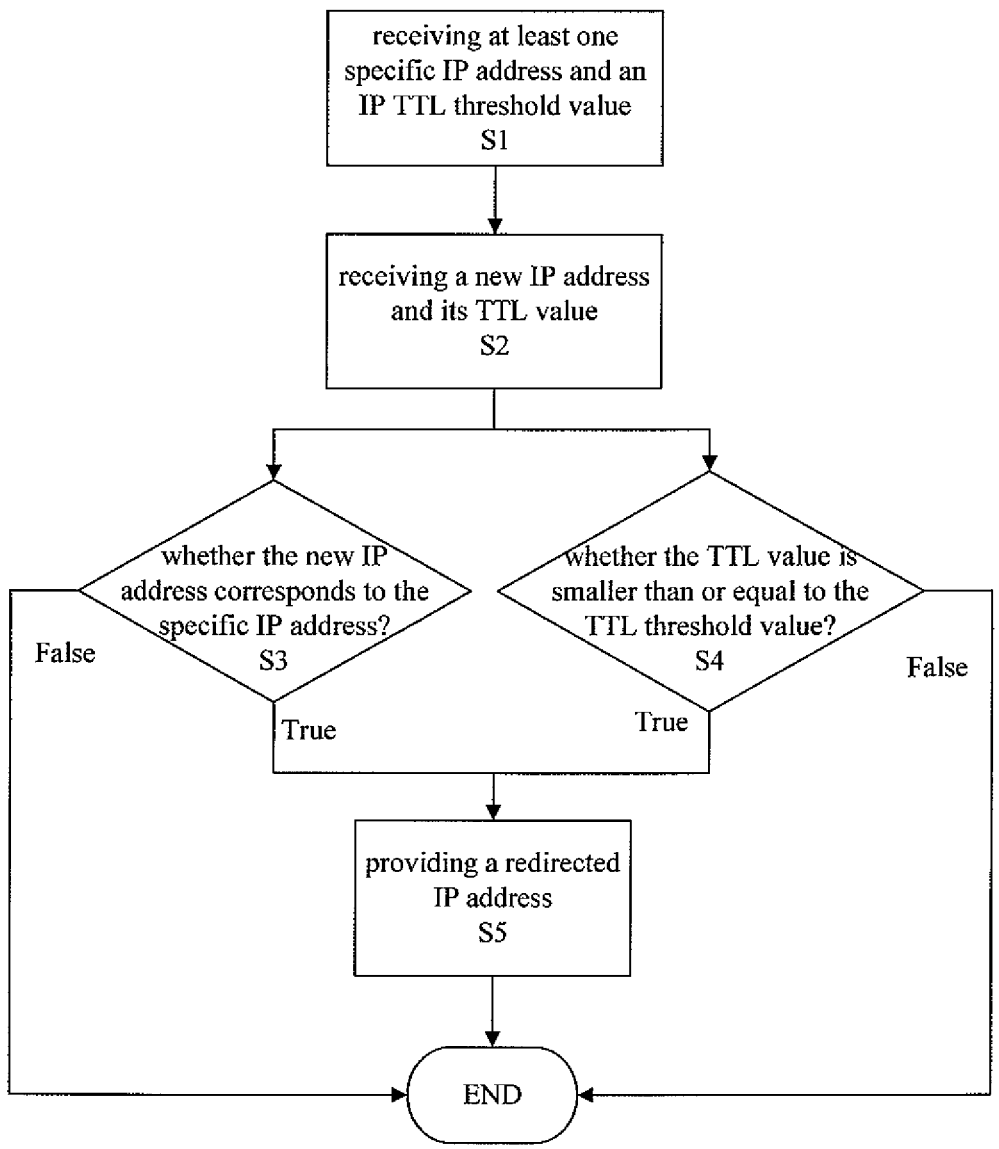
FIG. 2 illustrates a flowchart of the method for preventing malicious communications in accordance with the present invention.

Please refer to FIG. 2 for a method for preventing malicious communications in the present invention, which comprises the following steps S1-S5.

S1: receiving at least one specific Internet Protocol (IP) address and a Time to Live (TTL) threshold value.

For example, the specific IP address can be the Localhost: 127.0.0.1 or at least one intranet IP address. A network administrator can use the present invention (for example, a specific software or program) to set the specific IP address to be 127.0.0.1 or an intranet IP address. In other words, when in FIG. 1A or FIG. 1B the user's computer 11 links to the specific IP address, it is determined that the user's computer 11 could possibly link to a malicious website with the attacked risk, which will be explained later.

However, the range of the specific IP address is not limited to these addresses mentioned above, as there can be other implementations for the specific IP address, which will be described further below. Also, it will be further described as to how the network administrator sets the IP TTL value.

S2: receiving a new IP address and a TTL value, with the TTL value being the time to live value of the new IP address.

For example, when the user's computer 11 in FIG. 1 tries to link to www.badsite.com, based on the IP address provided by the DDNS 30, the present invention receives the new IP address (for example 127.0.0.1) and its Time to Live (TTL) value. Furthermore, according to the DNS (or DDNS) hierarchy and communication protocol, when the user's computer 11 queries the website, the DDNS 30 shown in FIG. 1A or FIG. 1B, for example, will return the query result (the corresponding IP address) to the user's computer 11 with a header recording the TTL value of the corresponding IP address. Thus, the TTL value is obtained through the response of the DNS or DDNS, which is known in the art.

S3: determining whether the new IP address corresponds to at least one specific IP address.

For example, it is determined whether the new IP address that the user's computer 11 links corresponds (or matches) to the specific IP address set by the network administrator. The specific IP address set by the network administrator not only comprises the local host IP and the intranet IP, but also comprises other unusual IP addresses. For example, a user in charge of domestic business has his computer keep trying to link to an IP address registered in Europe. Then, this unusual IP address can be set as a specific IP address by the network administrator.

If in step S3 it is determined to be "True", for example, the new IP address is matching with 127.0.0.1 or other specific IP address set by the network administrator, the present invention can provide a redirected IP address (in step S5) to redirect the user's computer 11 to the redirected IP address instead of the new IP address. When the user's computer 11 is redirected to the redirected IP address, the method of the present invention can also record the content of the malicious communication between the user's computer 11 and the repeater 40.

S4: determining whether the TTL value is smaller than or equal to the TTL threshold value.

In this step, it is determined whether the TTL value corresponding to the new IP address received by the user's computer 11 is smaller than or equal to the TTL threshold value set by the network administrator. Furthermore, it is unusual to set the TTL to be a very short period, that is, the IP address would be unusual with frequent changes. Therefore, the network administrator can set the TTL threshold value to be less than one month, for example 86,400 seconds (one day), more or less, which is set based on the rule of thumb. According to some cases of malicious communications, the TTL value is usually 60 or 300 seconds, which is obviously not reasonable for network applications. Therefore, the TTL value is an important factor in determining a malicious communication.

If in step 34 it is determined to be "True", then the present invention can provide a redirected IP address (S5) to redirect the user's computer 11 to the redirected IP address instead of the new IP address. When the user's computer 11 is redirected to the redirected IP address, the method of the present invention can also record the content of the malicious communication between the user's computer 11 and the repeater 40.

The above method is preferably implemented in a computer program. Therefore, the method of the present invention can be embodied in the computer program loaded in a computer readable medium, such as a hard drive, an integrated circuit or other entities capable of loading a computer program.

Still further, the method for preventing malicious communication in the present invention can be implemented in a computer program written in various computer languages for execution, and the computer program can be stored in any recording medium readable or recognizable by the microprocessor unit, or any devices comprising the recording medium in any form. Preferably, the recording medium is CD, CD-R, MO, floppy disc, hard drive disc, IC chip or any other device comprising the recording medium known in the art. The detailed implementation of the computer program will be omitted for the sake of brevity since any one who is familiar with computer programming should be able to write a computer program according to the specification of the present invention.

Figure 3:
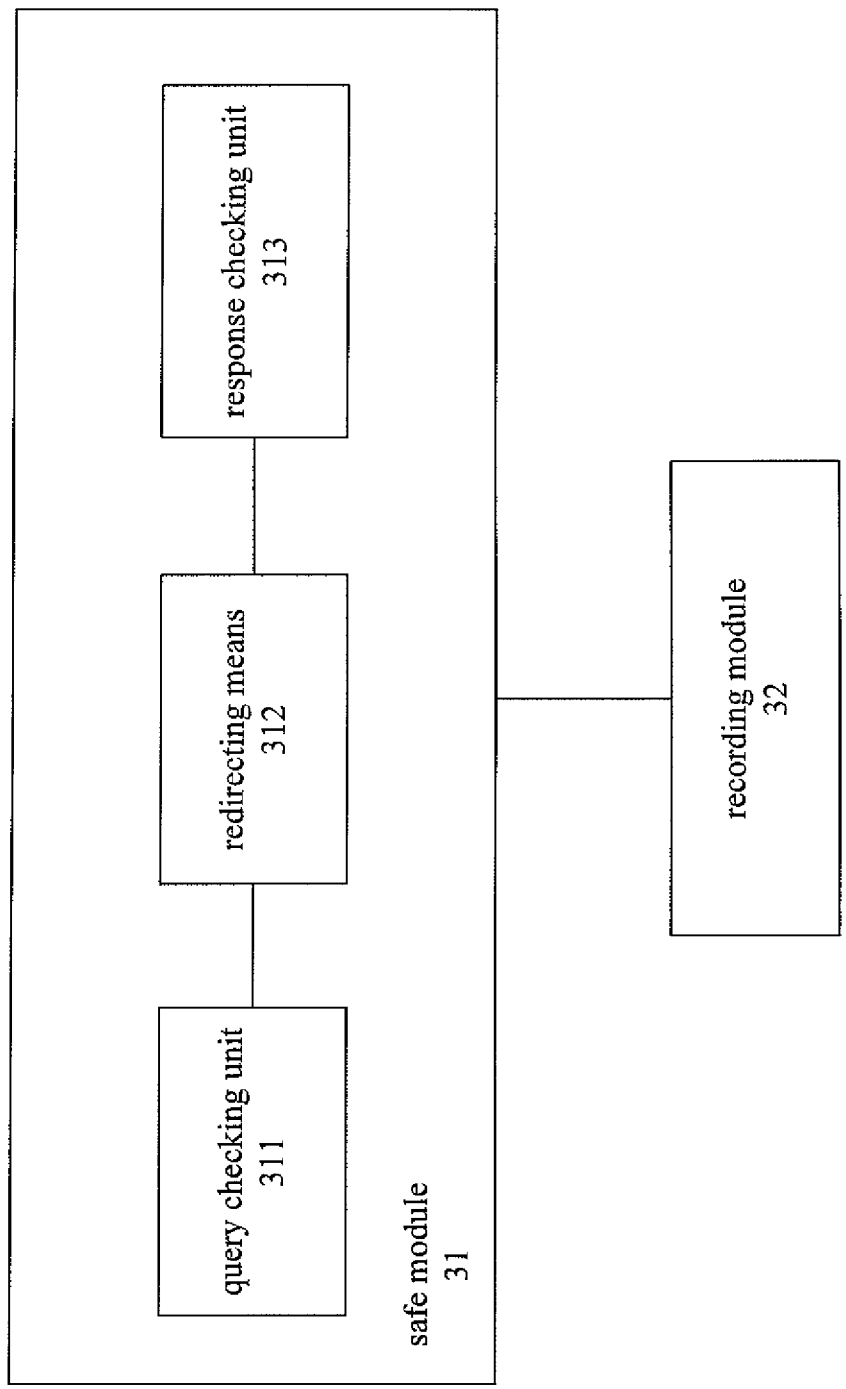
FIG. 3 illustrates a block diagram of the system for preventing malicious communications in accordance with the present invention.

Besides, as shown in FIG. 3, the present invention provides a system for preventing malicious communications, which comprises: a safe module 31 and a recording module 32. The safe module 31 identifies a malicious communication and redirects the malicious communication to a redirected IP address according to a website query list, a new IP address or a TTL. The recording module 32 records the malicious communication redirected to the redirected IP address, with the safe module 31 being an embedded or a plug-in module of a domain name server (DNS). For example, the safe module 31 is embedded or plugged into the server 10 shown in FIG. 1.

Furthermore, the sate module 31 comprises a query checking unit 311 set with the website query list. The website query list can be a list of malicious websites provided by anti-virus software providers or other like sources. When the user's computer 11 tries to link to a website, the query checking unit 311 can check with the website query list to see whether the website corresponds to the website query list to identify the malicious communication. In this embodiment, if the query checking unit 311 finds out that the website address (or IP address) corresponds (or matches) to the website query list, which means a malicious communication exists, it is possible to use other manners to stop linking or connecting to the malicious website. In a preferred embodiment, the safe module 31 redirects the malicious communication to a redirected IP address and records the content of the malicious communication through the recording module 32.

The safe module 31 further comprises a response checking unit 313. When the query checking unit 311 finds out that the website address (or IP address) does not correspond to the website query list, the safe module 31 receives the new IP address and the TTL. Still further, when the query checking unit 311 finds out that the website address (or IP address) does not correspond to the website query list, the DNS or DDNS can provide the new IP to the response checking unit 313.

Here, the response checking unit 313 checks the new IP address and its TTL to see whether it is a malicious communication. For example, the response checking unit 313 can use the method described in FIG. 2. Therefore, it will not be further explained how the response checking unit 313 checks the new IP address and its TTL.

In order to achieve another object of the present invention to locate more malicious software and to develop cracking and anti-hacking techniques, the safe module 31 further comprises a redirecting device 312. When the query checking unit 311 or the response checking unit 313 identifies a malicious communication, the redirecting device 312 redirects the malicious communication to the redirected IP address. In this embodiment, a monitoring device (software/hardware based) is set with the redirected IP address to log the content of the malicious communication for finding out more contents or activities about the malicious software to develop cracking and anti-hacking techniques. Since the network logging techniques are known in the art, it will not be further described for the sake of brevity.

It is noted that the above-mentioned embodiments are only for illustration, and it is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. Method comprising:
   receiving at least one specific Internet Protocol (IP) address and a Time to Live (TTL) threshold value thereof;
   receiving a new IP address and a TTL value, wherein the TTL value is the time to live value of the new IP address and obtained through a domain name server (DNS) or a dynamic DNS (DDNS);
   determining whether the new IP address corresponds to the at least one specific IP address;
   determining whether the TTL value is smaller than or equal to the TTL threshold value; and
   redirecting as a malicious communication to a redirected IP address when at least one of the following conditions is met:
   (1) when determining that the new IP address corresponds to the at least one specific IP address is "True"; and
   (2) when determining that the TTL value is smaller than or equal to the TTL threshold value is "True".

2. The method as claimed in claim 1 further comprising: recording a content of the malicious communication.

3. The method as claimed in claim 1, wherein the TTL threshold value is less than one month.

4. The method as claimed in claim 1, wherein the at least one specific IP address is 127.0.0.1 or at least one intranet IP address.

5. A computer readable article comprising a medium for recording program codes consisting of one of a CD, CD-R, MO, floppy disc, hard drive disc, and IC chip, wherein the medium comprises program codes for:
   receiving at least one specific IP address and a TTL threshold value thereof;
   receiving a new IP address and a TTL value, wherein the TTL value is the time to live value of the new IP address and obtained through a domain name server (DNS) or a dynamic DNS (DDNS);
   determining whether the new IP address corresponds to the at least one specific IP address;
   determining whether the TTL value is smaller than or equal to the TTL threshold value; and
   redirecting as a malicious communication to a redirected IP address when at least one of the following conditions is met:
   (1) when determining that the new IP address corresponds to the at least one specific IP address is "True"; and
   (2) when determining that the TTL value is smaller than or equal to the TTL threshold value is "True".

6. The article as claimed in claim 5, wherein the medium further comprises program codes for: recording a content of the malicious communication.

7. The article as claimed in claim 5, wherein the TTL threshold value is less than one month.

8. The article as claimed in claim 5, wherein the at least one specific IP address is 127.0.0.1 or at least one intranet IP address.

9. A method comprising:
   receiving at least one specific IP address and an IP TTL threshold value;
   receiving a new IP address and a TTL value, wherein the TTL value is the time to live value of the new IP address and obtained through a domain name server (DNS) or a dynamic DNS (DDNS); and
   redirecting as a malicious communication to a redirected IP address when at least one of the following conditions is met:
   (1) when determining that the new IP address corresponds to the at least one specific IP address is "True"; and
   (2) when determining that the TTL value is smaller than or equal to the TTL threshold value is "True".

10. The method as claimed in claim 9, wherein after redirecting to the redirected IP address, the method further comprises:
    recording a content of the malicious communication.

11. The method as claimed in claim 10, wherein the TTL threshold value is less than one month.

12. The method as claimed in claim 10, wherein the at least one specific IP address is 127.0.0.1 or at least one intranet IP address.

* * * * *